(12) United States Patent
Moriyama et al.

(10) Patent No.: US 8,955,814 B2
(45) Date of Patent: Feb. 17, 2015

(54) SEAT SLIDE APPARATUS FOR VEHICLE

(75) Inventors: Genta Moriyama, Anjo (JP); Tsutomu Oya, Kariya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 615 days.

(21) Appl. No.: 13/231,048

(22) Filed: Sep. 13, 2011

(65) Prior Publication Data

US 2012/0061547 A1  Mar. 15, 2012

(30) Foreign Application Priority Data

Sep. 15, 2010  (JP) ................. 2010-206719

(51) Int. Cl.
  *F16M 13/00*  (2006.01)
  *B60N 2/07*  (2006.01)
  *B60N 2/08*  (2006.01)
  *B60N 2/02*  (2006.01)

(52) U.S. Cl.
  CPC ............ *B60N 2/0705* (2013.01); *B60N 2/0735* (2013.01); *B60N 2/0843* (2013.01); *B60N 2002/0208* (2013.01)
  USPC .......................................... 248/430; 248/429

(58) Field of Classification Search
  USPC .......................................... 248/424, 429, 430
  See application file for complete search history.

(56) References Cited

U.S. PATENT DOCUMENTS

| | | | |
|---|---|---|---|
| 5,192,045 A * | 3/1993 | Yamada et al. | 248/430 |
| 6,176,460 B1 * | 1/2001 | Kojima et al. | 248/429 |
| 6,220,642 B1 * | 4/2001 | Ito et al. | 296/65.14 |
| 6,691,971 B2 | 2/2004 | Yamada et al. | |
| 7,735,798 B2 * | 6/2010 | Kojima | 248/429 |
| 8,393,590 B2 * | 3/2013 | Kato et al. | 248/394 |
| 2004/0118990 A1 * | 6/2004 | Yokoi et al. | 248/424 |
| 2008/0290706 A1 | 11/2008 | Yamada et al. | |
| 2011/0233365 A1 * | 9/2011 | Kato et al. | 248/429 |
| 2012/0061548 A1 | 3/2012 | Moriyama et al. | |

FOREIGN PATENT DOCUMENTS

| | | |
|---|---|---|
| CN | 101130347 A | 2/2008 |
| CN | 101678782 A | 3/2010 |
| JP | 63-2630 U | 1/1988 |
| JP | 63-44837 U | 3/1988 |

(Continued)

OTHER PUBLICATIONS

U.S. Appl. No. 13/231,172, filed Sep. 13, 2011, Moriyama, et al.
U.S. Appl. No. 13/551,955, filed Jul. 18, 2012, Moriyama, et al.
Office Action issued Jun. 17, 2014, in Japanese Patent Application No. 2010-206719 (with English-language translation).
Office Action dated Nov. 24, 2014 in Chinese Patent Application No. 201110287210.X (English-language translation).

*Primary Examiner* — Gwendolyn W Baxter
(74) *Attorney, Agent, or Firm* — Oblon, Spivak, McClelland, Maier & Neustadt, L.L.P.

(57) ABSTRACT

A seat slide apparatus for a vehicle includes: a lower rail that is fixed on a vehicle floor and extends in a front-rear direction of the vehicle; and an upper rail that is fixed to a seat and is movably supported on the lower rail in the front-rear direction of the vehicle, wherein the lower rail has a lower rail hook part extending in a width direction of the vehicle, wherein the upper rail has: a pair of rolling members arranged in the front-rear direction of the upper rail; and a shoe, which has a sliding contact part that slidingly contacts a lower surface of the lower rail hook part, wherein the lower rail has a curvature part that is convex downwards as viewed from the width direction, and wherein the shoe is arranged at an outer side of the pair of rolling members in the front-rear direction.

10 Claims, 10 Drawing Sheets

(56) References Cited

FOREIGN PATENT DOCUMENTS

| JP | 9-254682 A | | 9/1997 | |
| JP | 11020523 A | * | 1/1999 | ............... B60N 2/06 |
| JP | 2003-63283 | | 3/2003 | |
| JP | 2004-306796 A | | 11/2004 | |
| JP | 3678191 | | 5/2005 | |
| JP | 2006-224865 A | | 8/2006 | |
| JP | 2007-69694 A | | 3/2007 | |
| JP | 2008-290625 | | 12/2008 | |
| JP | 2009-6791 A | | 1/2009 | |

* cited by examiner

SEAT SLIDE APPARATUS FOR VEHICLE

CROSS-REFERENCE TO RELATED APPLICATION

This application claims priority from Japanese Patent Application No. 2010-206719 filed on Sep. 15, 2010, the entire subject matter of which is incorporated herein by reference.

TECHNICAL FILED

The disclosure relates to a seat slide apparatus for a vehicle.

BACKGROUND DISCUSSION

For example, JP2008-290625A discloses a seat slide apparatus for a vehicle. The vehicle is a so-called three-row seat vehicle having a front seat, a second-row seat and a third-row seat, in which a lower rail fixed on a vehicle floor with extending in the front-rear direction of the vehicle is mounted in a range corresponding to normal positions of the second-row and third-row seats. An upper rail, which is fixed to the second-row seat and is configured to move along the lower rail, is provided to move over a wide range (range corresponding to the normal positions of the second-row and third-row seats) in the front-rear direction of the vehicle.

Also, JP 3678191B discloses a seat slide apparatus for a vehicle. In the seat slide apparatus for a vehicle, the upper rail has a pair of rolling members in the front-rear direction and a shoe. The pair of rolling members allows the upper rail to move relatively to the lower rail in the front-rear direction. The shoe has a sliding contact part that slidingly contacts a lower surface of the lower rail by own elastic force so as to suppress the upper rail from rattling upwards with respect to the lower rail between the rolling members. According to the seat slide apparatus for a vehicle, the smooth moving is secured while the upper rail is suppressed from rattling.

There is a so-called three-row seat vehicle in which the vehicle floor is bent between the normal position of the front seat and the normal position of the second-row seat, and a rear side thereof is inclined. However, in the related seat slide apparatus for a vehicle, a planar vehicle floor is generally assumed, so that the lower rail is linearly designed. The design is not corresponding to the bending (inclination) of the vehicle floor, and a problem, which occurs when the lower rail including the bent part is provided, is not considered at all. Specifically, the problem, which occurs with regard to the shoe provided between the rolling members of the upper rail, is not also considered. In a related seat slide apparatus for a vehicle in which the lower rail is provided to avoid the bent part, a problem occurs in that the degree of moving freedom of the front seat in the front-rear direction is to be limited.

A need thus exists for a seat slide apparatus for a vehicle which is not susceptible to the drawback mentioned above.

SUMMARY

A seat slide apparatus for a vehicle comprising a lower rail that is fixed on a vehicle floor and extends in a front-rear direction of the vehicle, and an upper rail that is fixed to a seat and is movably supported on the lower rail in the front-rear direction of the vehicle. The lower rail has a lower rail hook part extending in a width direction of the vehicle. The upper rail has a pair of rolling members, which allow the upper rail to move with respect to the lower rail in the front-rear direction, and which are arranged in the front-rear direction of the upper rail and a shoe, which has a sliding contact part that slidingly contacts a lower surface of the lower rail hook part by own elastic force so as to suppress the upper rail from rattling upwards with respect to the lower rail. The lower rail has a curvature part that is convex downwards as viewed from the width direction of the vehicle. The shoe is arranged at an outer side of the pair of rolling members in the front-rear direction of the vehicle.

According to an aspect of the disclosure, it can be provided that a seat slide apparatus for a vehicle, in which a lower rail including a bent part of a vehicle floor is provided to improve the degree of moving freedom of a seat, and in which an upper rail is suppressed from rattling and smooth moving thereof is secured.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

An illustrative embodiment will be explained with reference to the attached drawings.

A seat slide apparatus for a vehicle of an illustrative embodiment comprising a lower rail that is fixed on a vehicle floor and extends in a front-rear direction of the vehicle, and an upper rail that is fixed to a seat and is movably supported on the lower rail in the front-rear direction of the vehicle. The lower rail has a lower rail hook part extending in a width direction of the vehicle. The upper rail has a pair of rolling members, which allow the upper rail to move with respect to the lower rail in the front-rear direction, and which are arranged in the front-rear direction of the upper rail and a shoe, which has a sliding contact part that slidingly contacts a lower surface of the lower rail hook part by own elastic force so as to suppress the upper rail from rattling upwards with respect to the lower rail. The lower rail has a curvature part that is convex downwards as viewed from the width direction of the vehicle. The shoe is arranged at an outer side of the pair of rolling members in the front-rear direction of the vehicle.

According to the above illustrative configuration, the lower rail has the curvature part. Thus, even if a vehicle floor is bent at a central part in the front-rear direction of the vehicle, it is possible to extend the lower rail including the central part.

Therefore, it is possible to improve the degree of moving freedom of the upper rail and the seat supported by the upper rail in the front-rear direction.

Further, the shoe is arranged at the outer side of the pair of rolling members in the front-rear direction of the vehicle. Accordingly, when the upper rail passes through the curvature part, the sliding contact part is prevented from being largely elastically deformed. Further, the sliding contact resistance thereof is prevented from being increased. Specifically, in case that the shoe is arranged between the pair of the rolling members as the related art, when the upper rail passes through the curvature part, the upper rail at the position, at which the shoe is arranged, is to be heightened with respect to the lower rail, so that the sliding contact part is largely elastically deformed. At this time, when the sliding contact part is elastically deformed beyond a predetermined threshold, the sliding contact resistance may be increased. In contrast, according to the above configuration, in which the shoe is arranged at the outer side of the pair of rolling members in the front-rear direction of the vehicle, when the upper rail passes through the curvature part, the upper rail at the position at which the shoe is arranged lowered (is to be spaced downwards) with respect to the lower rail 11. Therefore, when the upper rail passes through the curvature part, the sliding contact part is prevented from being largely elastically deformed. Further, the sliding contact resistance thereof is prevented from being increased. As a result, the smooth moving of the upper rail (seat) is secured.

In addition to the configuration of the above seat slide apparatus for the vehicle, the shoe may be provided in a pair in the front-rear direction of the vehicle, and each of the shoes may be respectively arranged at outer sides of the pair of rolling members in the front-rear direction of the vehicle.

According to the above configuration, the shoe is provided in a pair in the front-rear direction of the vehicle and is respectively arranged at the outer sides of the pair of rolling members in the front-rear direction of the direction. Accordingly, it is possible to suppress the upward rattling of the upper rail in balance at both sides of the upper rail in the front-rear direction. Also, when the upper rail passes through the curvature part, the sliding contact resistance is prevented from being increased by the each of shoes.

In addition to the configuration of the above seat slide apparatus for the vehicle, the shoe may be provided in a pair in the front-rear direction of the vehicle, and the one shoe may be arranged at the outer side of the pair of rolling members in the front-rear direction of the vehicle and the other shoe may be arranged between the pair of rolling members.

According to the above configuration, the shoe is provided in a pair in the front-rear direction of the vehicle and the one shoe is arranged at the outer side of the pair of rolling members in the front-rear direction of the vehicle and the other shoe is arranged between the pair of rolling members. Accordingly, when the upper rail passes through the curvature part, the sliding contact resistance of the one shoe is reduced and the sliding contact resistance of the other shoe is increased. Accordingly, the sliding contact resistances are cancelled between the pair of shoes, so that it is possible to reduce a difference with the total contact resistance when the upper rail moves along the linear part of the lower rail.

In addition to the configuration of the above seat slide apparatus for the vehicle, the lower rail may be formed with a plurality of lock holes in a longitudinal direction thereof, and the upper rail may have a lock claw that can be inserted into the lock holes and restrain the upper rail from moving relatively to the lower rail in the front-rear direction. The lock holes may be formed at the lower rail with avoiding the curvature part.

According to the above configuration, since the lock holes are formed at the lower rail with avoiding the curvature part (i.e., the lock holes are formed at the front side from the curvature part and at the rear side from the curvature part), the upper rail (seat) is not fixed at the position corresponding to the curvature part. Thereby, since the upper rail is not fixed at the position corresponding to the curvature part at which it is concerned that the effect of suppressing the upward rattling of the upper rail by the reduction of the elastic deformation amount of the sliding contact part may be reduced, it is possible to suppress the rattling (and vibration due to the rattling) at the fixed state.

In addition to the configuration of the above seat slide apparatus for the vehicle, vehicle floor may have a plurality of floor fixing parts. The floor fixing parts may be protruded upwards and may be arranged in the front-rear direction. The lower rail may have a plurality of lower fixing parts. The lower fixing parts may be respectively contacted and fixed on upper surfaces of the floor fixing parts and may be arranged in the front-rear direction. And then, the curvature part may be formed between the lower fixing parts.

According to the above configuration, since the curvature part is formed between the lower fixing parts that are contacted and fixed on the upper surfaces of the floor fixing parts, it is possible to strongly fix the lower rail on the vehicle floor without the rattling. In other words, if the lower fixing parts are formed at the curvature part, it is difficult to closely contact the lower fixing parts and the upper surfaces of the floor fixing parts, so that the rattling easily occurs. However, according to the above configuration, it is possible to strongly fix the lower rail on the vehicle floor with avoiding the rattling.

In addition to the configuration of the above seat slide apparatus for the vehicle, three upper rails fixed to respective seats may be supported on the lower rail According to the above configuration, the three upper rails, which are respectively fixed to the seats, are supported on the lower rail. Accordingly, in the three-row seat vehicle having a front seat, a second-row seat and a third-row seat, it is possible to improve the degree of moving freedom of the respect seats in the front-rear direction. Also, compared to a configuration in which the lower rail for the front seat and the lower rails for the second-row seat and the third-row seat are separately provided, it is possible to reduce the number of parts.

In addition to the configuration of the above seat slide apparatus for the vehicle, the curvature part may have a circular arc shape having a center point at an upper side as viewed from the width direction of the vehicle.

In addition to the configuration of the above seat slide apparatus for the vehicle, the lower rail hook part may have a pair of inner extension portions extending toward an inner side in the width direction of the vehicle, wherein each of the pair of the inner extension portions extends opposite each other, and a downward extension portion extending downwards from an end of the inner extension portion.

In addition to the configuration of the above seat slide apparatus for the vehicle, the lock holes may be formed at the front side from the curvature part and at the rear side from the curvature part.

Hereinafter, an illustrative embodiment of the disclosure will be described with reference to the FIGS. 1 to 9.

Figure 1:
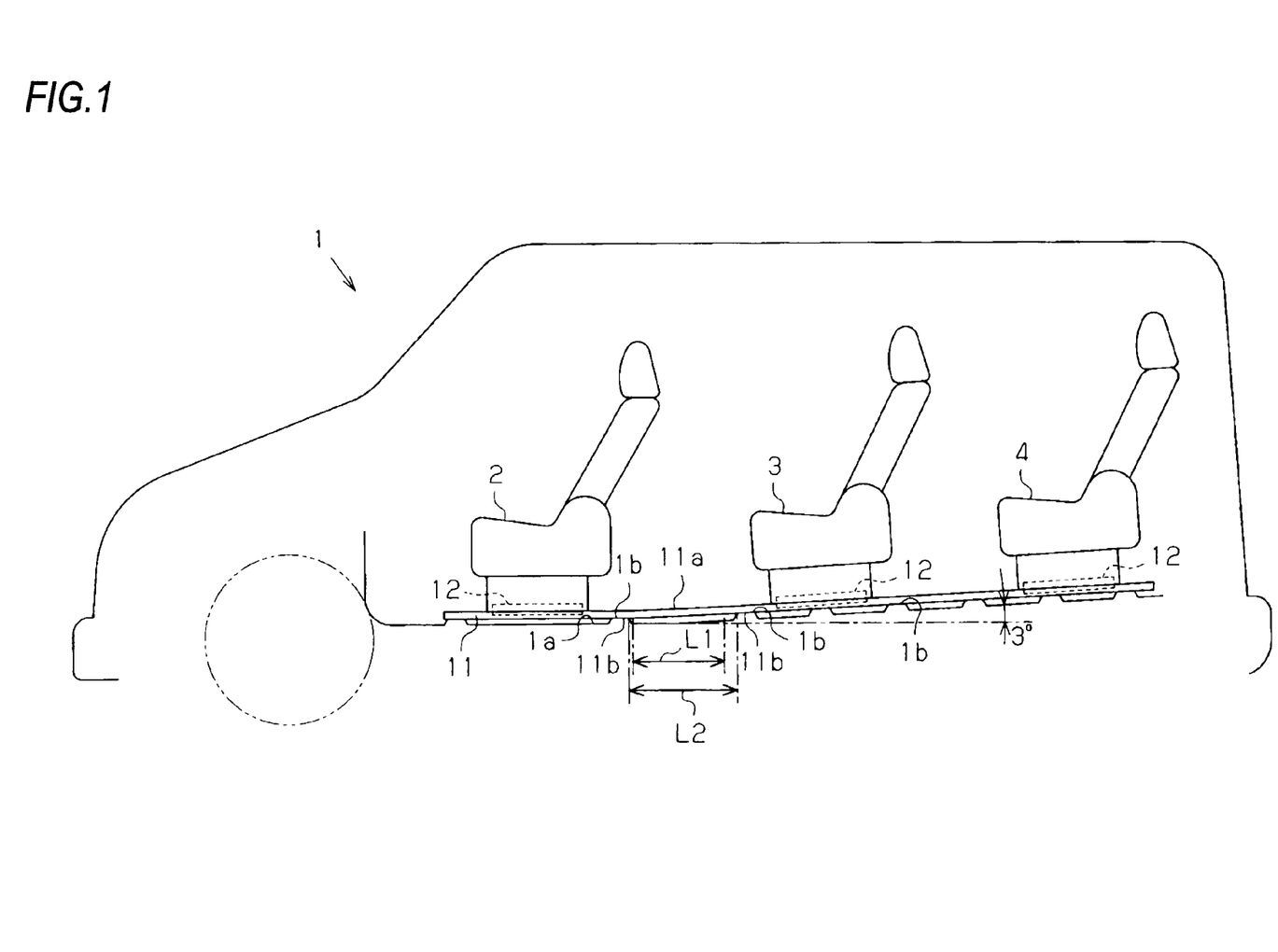
FIG. 1 is a schematic side view illustrating a vehicle and seats according to an illustrative embodiment.

FIG. 1 is a schematic side view illustrating a vehicle 1. Three seats 2 to 4 (configured by front seat 2 of an assistant driver side, second-row seat 3 and third-row seat 4) provided to the vehicle 1. As shown in FIG. 1, a metal lower rail 11 extending in the front-rear direction of the vehicle is fixed on a vehicle floor 1a. Metal upper rails 12, which are respectively fixed to the seats 2 to 4, are supported on the lower rail 11 to allow the movement in the front-rear direction of the vehicle. In the meantime, the lower rails 11 and the upper rails 12, which configure a part of a seat slide apparatus for a vehicle, are provided in a pair, each of which is the substantially same, in a width direction (a direction orthogonal to the sheet in FIG. 1) of the seats 2 to 4. In the below, one of the rails (the fore rails in FIG. 1) is respectively shown and will be described.

Figure 2:
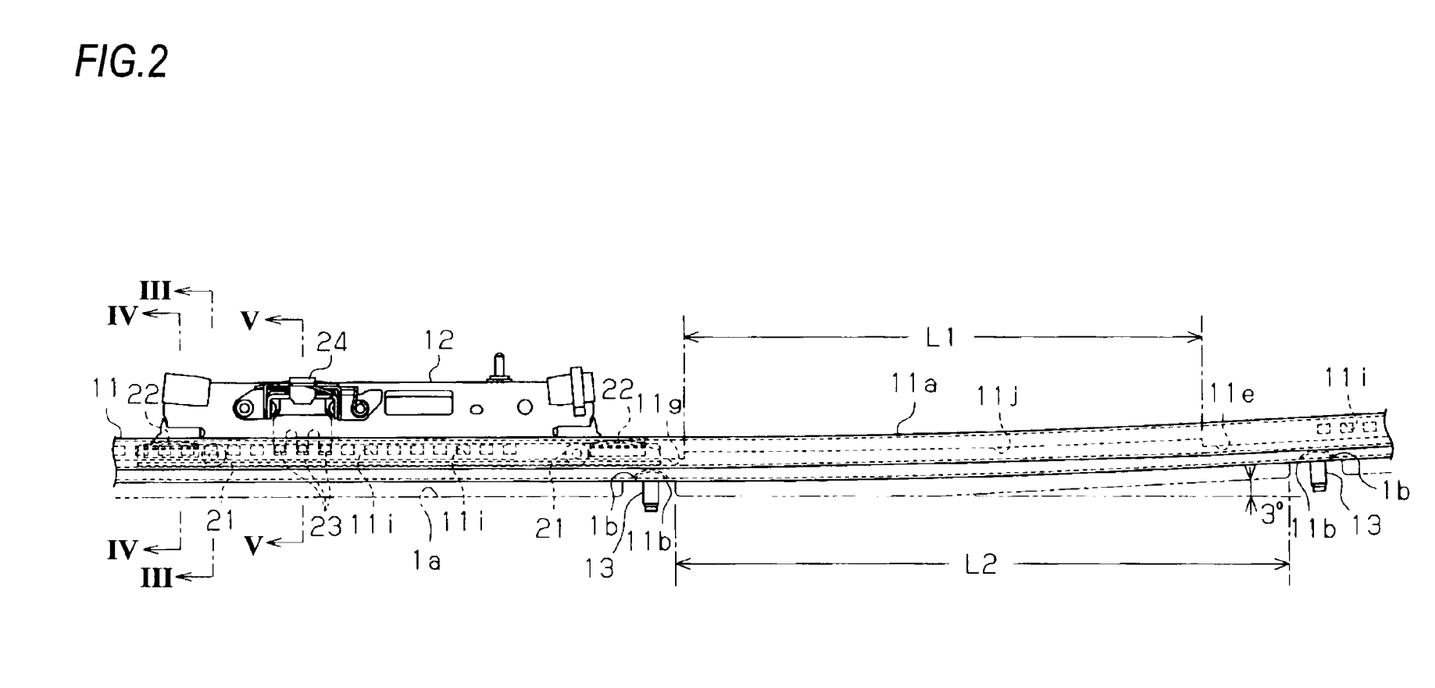
FIG. 2 is a side view illustrating a seat slide apparatus for a vehicle according to an illustrative embodiment.

As shown in FIGS. 1 and 2, the vehicle floor 1a of this illustrative embodiment is bent between a normal position of the front seat 2 and a normal position of the second-row seat 3 at a central part in the front-rear direction of the vehicle, and is inclined rearwards. Incidentally, the normal position is a position at which each of the seats 2 to 4 are apart from each other so that each of passengers can effortlessly sit on the each of sheets, as shown in FIG. 1. In this illustrative embodiment, the vehicle floor 1a is configured so that a rear side of the bent part is inclined by three degrees with respect to the horizontal front side. Also, the vehicle floor 1a has a plurality of floor fixing parts 1b, which are protruded upward, and which are arranged in the front-rear direction. The floor fixing part 1b has a planar upper surface and a fixing hole (not shown) that is formed at a center of the upper surface.

The lower rail 11 has a curvature part 11a, which is convex downwards as viewed from a width direction of the vehicle, at a position corresponding to the bent position of the vehicle floor 1a. Specifically, the curvature part 11a has a circular arc shape having a center point at the upper side. In this illustrative embodiment, the curvature part 11a has a circular arc shape having a radius of about 7000 mm and having a length of 367 mm (L1 in FIGS. 1 and 2) over the lower rail 11 in the front-rear direction. Also, as shown in FIGS. 1 and 2, the curvature part 11a is formed between a plurality of lower fixing parts 11b that is contacted and fixed on upper surfaces of the floor fixing parts 1b. In this illustrative embodiment, the lower fixing part 11b having a hole (not shown) at a center is fastened to the floor fixing part 1b by a screw 13 (refer to FIG. 2) penetrating the hole and the fixing hole of the floor fixing part 1b. In this illustrative embodiment, a length between the lower fixing parts 11b corresponding to the curvature part 11a is about 400 mm (L2 in FIGS. 1 and 2), and the curvature part 11a (having the length of 367 mm (L1 in FIGS. 1 and 2)) is formed within the range between the lower fixing parts 11b.

Figure 3:
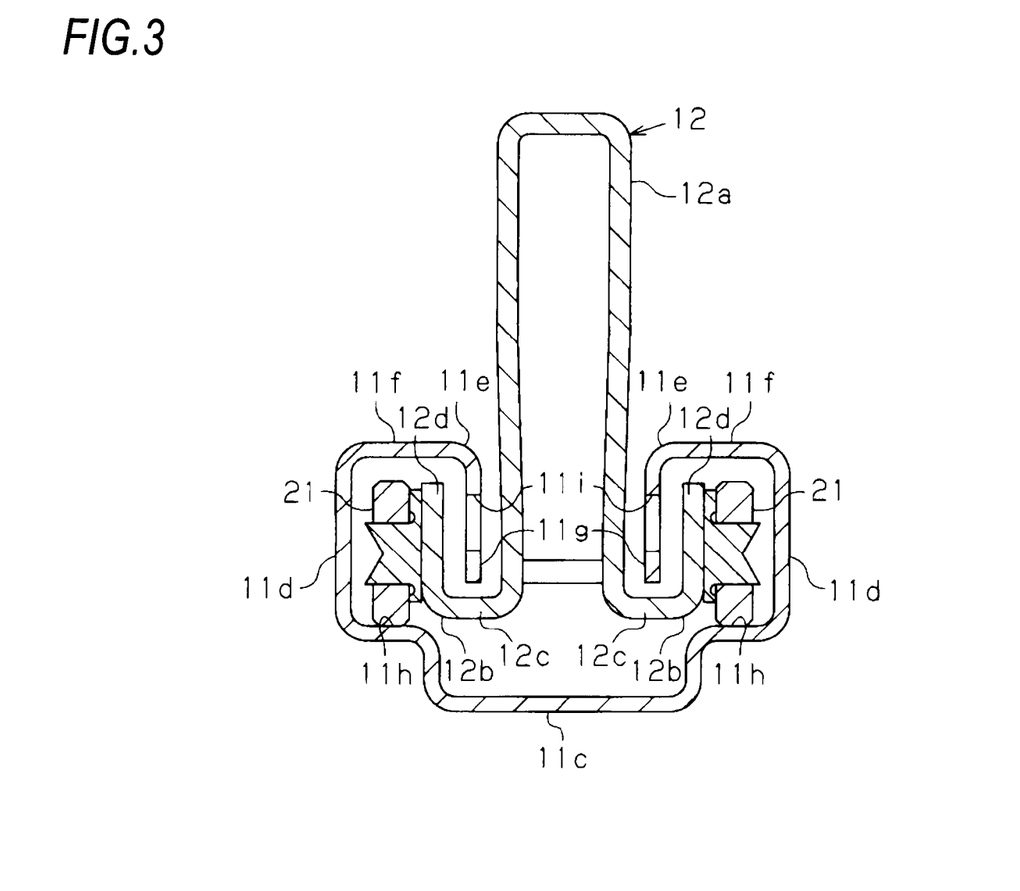
FIG. 3 is a sectional view taken along a line III-III of FIG. 2.

As shown in FIG. 3, the lower rail 11 has a bottom wall part 11c extending in the front-rear direction of the vehicle, sidewall parts 11d standing from both end portions of the bottom wall part 11c in the width direction of the vehicle, and lower rail hook parts 11e formed at upper ends of the sidewall parts 11d. The two lower rail hook parts 11e have, respectively, an inner extension portion 11f and a downward extension portion 11g. The inner extension portion 11f extends toward an inner side in the width direction of the vehicle (opposite direction). The downward extension portion 11g extends downwards from an end of the inner extension portion 11f. Also, in this illustrative embodiment, both end portions of the bottom wall part 11c in the width direction of the vehicle have steps, so that both end portions thereof is configured as traveling rail portions 11h arranged at more upward positions than a center portion of the bottom wall part. In addition, the downward extension portion 11g of the lower rail hook part 11e is formed with a plurality of lock holes 11i (refer to FIGS. 2 to 5) having a substantially rectangular shape, with a predetermined interval in a longitudinal direction (front-rear direction of the vehicle).

As shown in FIG. 3, the upper rail 12 has a pair of main body wall parts 12a and upper rail hook parts 12b. The each of the main body wall parts 12a faces in the width direction of the vehicle and are disposed between the pair of lower rail hook parts 11e. Upper ends of main body wall parts 12a are connected to each other. The upper rail hook parts 12b are formed at outer sides of lower ends of the main body wall parts 12a in the width direction. The upper rail hook parts 12b have, respectively, an outer extension portion 12c and an upward extension portion 12d. The outer extension portion 12c extends toward an outer side (to be spaced from each other) in the width direction of the vehicle. The upward extension portion 12d extends upwards from an end of the outer extension part 12c. The outer extension portion 12c is disposed below the downward extension portion 11g (with a slight gap), so that the upward extension portions 12d face the downward extension portion 11g in the width direction. As a result, the upper rail hook part 12b is allowed to engage to the lower rail hook part 11e in the upward and width directions and is prevented from separating from the lower rail hook part 11e.

Figure 6:
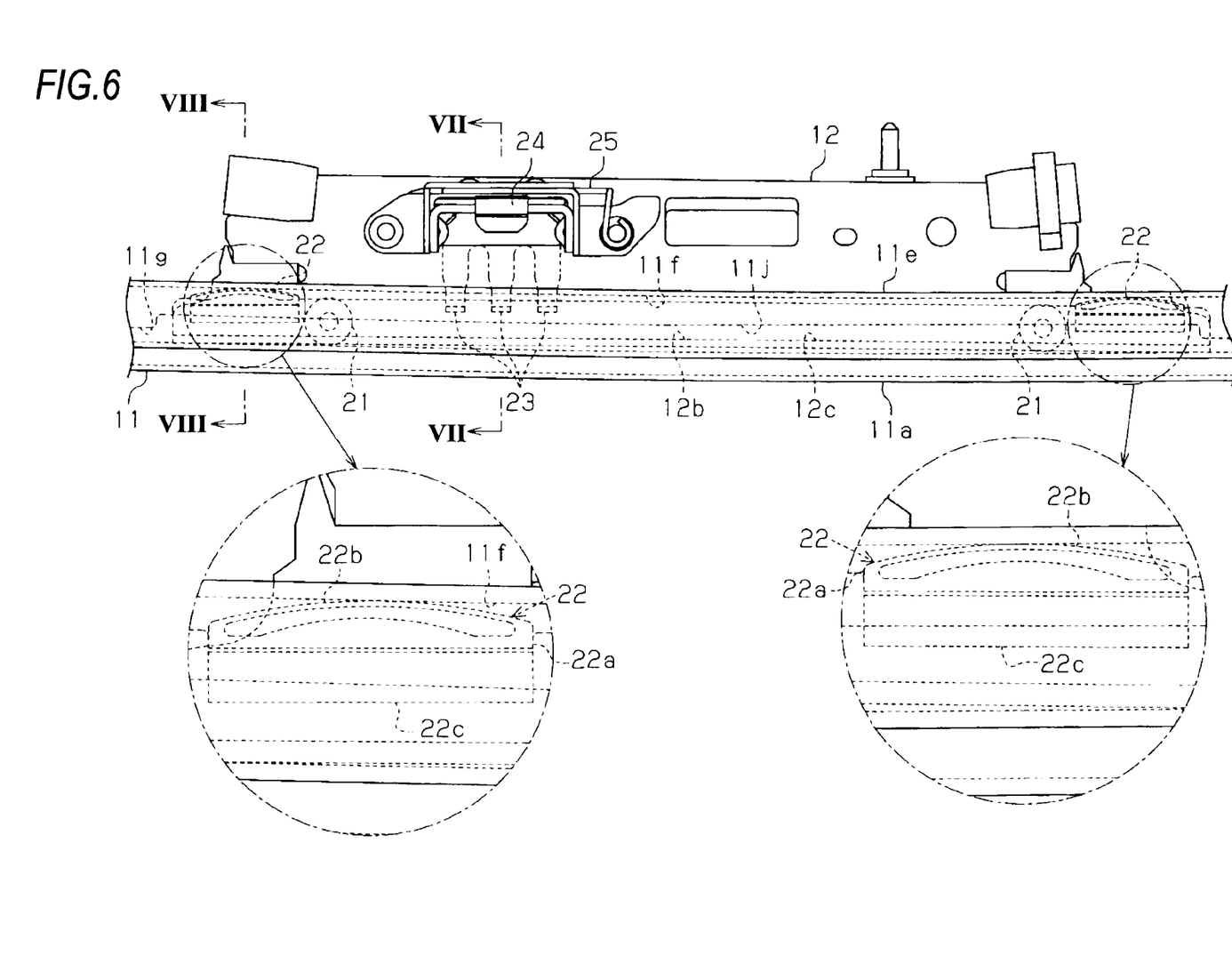
FIG. 6 is a side view illustrating a seat slide apparatus for a vehicle according to an illustrative embodiment.

As shown in FIGS. 2, 3 and 6, the upper rail 12 has a pair of rolling members 21 in the front-rear direction of the upper rail 12. The rolling members 21 allow the upper rail 12 to move forward and rearward with respect to the lower rail 11 with keeping a space with the lower rail 11 in the upper-lower direction. In this illustrative embodiment, as shown in FIG. 3, the rolling members 21 are rotatably supported at the upward extension portions 12d and are rotatable on the traveling rail portions 11h of the lower rail 11, thereby enabling the upper rail 12 to move (travel) in the front-rear direction.

Figure 4:
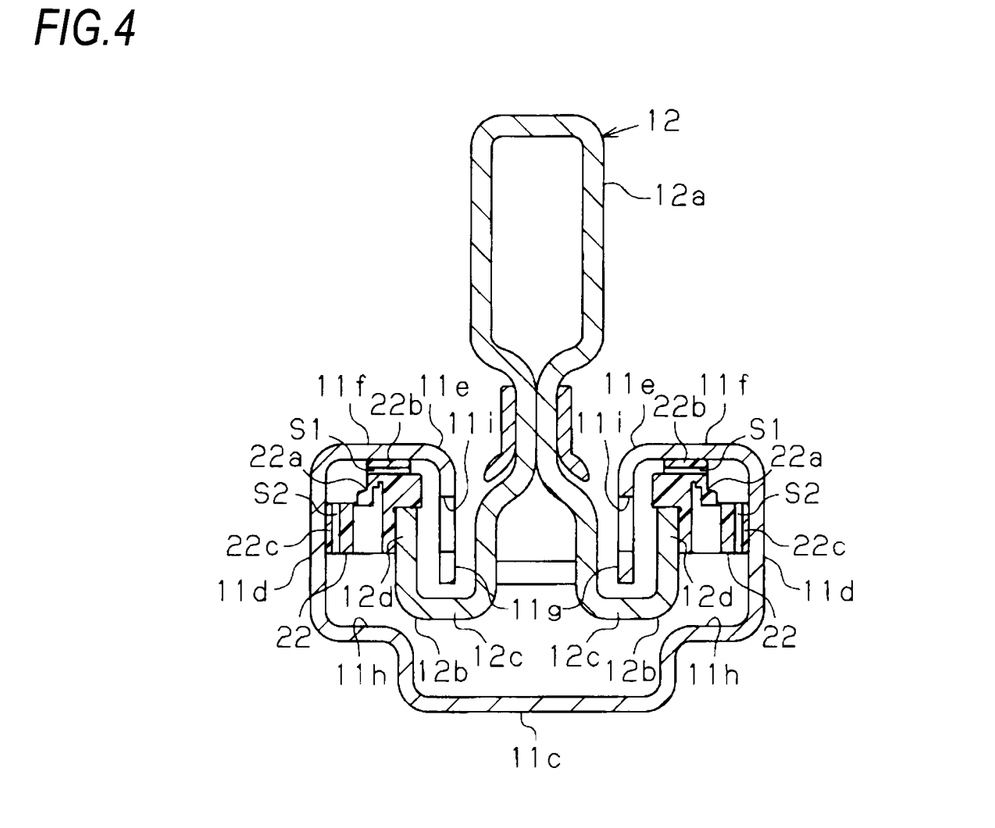
FIG. 4 is a sectional view taken along a line IV-IV of FIG. 2.

Also, as shown in FIGS. 2, 4 and 6, the upper rail 12 has shoes 22 to suppress the upper rail from rattling with respect to the lower rail 11. In this illustrative embodiment, the shoe 22 is made of resin and has a fixing base part 22a that is fixed to the end of the upper rail hook part 12b (upward extension portion 12d), as shown in FIG. 4. In addition, the shoe 22 has an upper sliding contact part 22b and side sliding contact part 22c. The upper sliding contact part 22b is provided at an upper portion of the fixing base part 22a and serves as a sliding contact part sliding on a lower surface of the lower rail hook part 11e (inner extension portion 11f thereof) by own elastic force. The side sliding contact part 22c is provided at a side portion (in the width direction of the vehicle) of the fixing base part 22a and sliding on an inner side surface of the sidewall part 11d by own elastic force. In this illustrative embodiment, the upper sliding contact part 22b has a gap S1 with the fixing base part 22a except for both end portions of the fixing base part in the front-rear direction (i.e., with a center of the fixing base part in the front-rear direction) so that it protrude from an upper surface of the fixing base part 22a. As a result, the upper sliding contact part 22b has elasticity (flexibility) in the upper-lower direction. Thereby, while the smooth moving of the upper rail 12 relative to the lower rail 11 is secured by the upper sliding contact parts 22b, the upward rattling of the upper rail 12 relative to the lower rail 11 is suppressed. Also, in this illustrative embodiment, the side sliding contact part 22c has a gap S2 with the fixing base part 22a except for both end portions of the fixing base part in the front-rear direction (i.e., with a center of the fixing base part in the front-rear direction) so that it protrude from a side surface of the fixing base part 22a. As a result, the side sliding contact part 22c has elasticity (flexibility) in the width direction (i.e., in the left-right direction in FIG. 4). Thereby, while the smooth moving of the upper rail 12 relative to the lower rail 11 is secured by the side sliding contact parts 22c, the rattling of the upper rail 12 relative to the lower rail 11 in the width direction is suppressed.

As shown in FIGS. 2 and 6, the shoes 22 are disposed at outer sides of the rolling members 21 in the front-rear direction of the vehicle. Specifically, in this illustrative embodiment, the shoes 22 are provided in a pair in the front-rear direction of the vehicle and are respectively arranged at the outer sides of the pair of the rolling members 21 in the front-rear direction of the vehicle.

Figure 5:
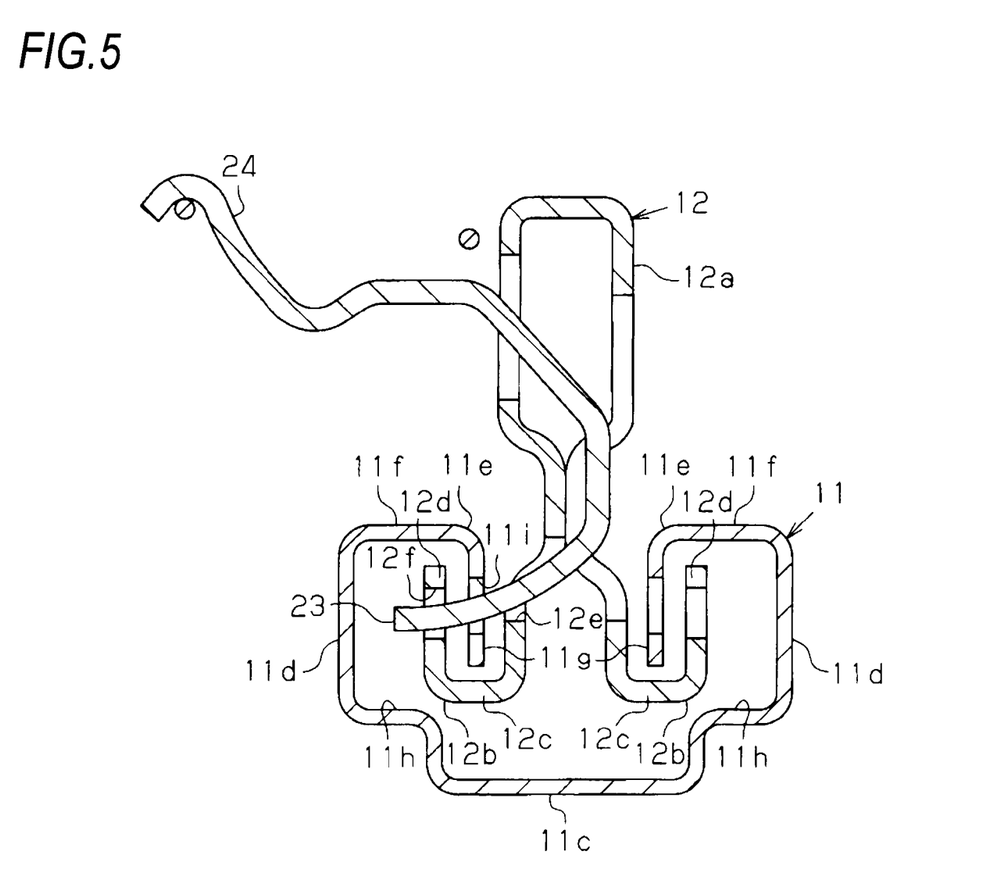
FIG. 5 is a sectional view taken along a line V-V of FIG. 2.

Also, as shown in FIGS. 2 and 5, the upper rail 12 has a lock claw 23, which cab be inserted into the lock holes 11i and is allowed to restrain the upper rail 12 from moving with respect to the lower rail 11 in the front-rear direction.

Specifically, as shown in FIG. 5, at the central part of the upper rail 12 in the front-rear direction, the main body wall parts 12a and the upward extension portions 12d are formed with a plurality of penetration holes 12e, 12f, with the predetermined interval (which is the same as that of the lock holes 11i) in the longitudinal direction (the front-rear direction of the vehicle).

At positions corresponding to the penetration holes 12e, 12f of the upper rail 12, a lock lever 24 having the lock claws 23, which can be inserted into the penetration holes 12e, 12f and the lock holes 11i, is rotatably coupled around a rotational axis of the upper rail 12 along the longitudinal direction thereof. As the lock lever 24 is rotated, the lock claw 23 can be inserted into and be separated from the penetration holes 12f and the lock holes 11i. When the lock claw 23 of the lock lever 24 are inserted into the penetration holes 12f and the lock holes 11i (refer to FIG. 5), the moving of the upper rail 12 relative to the lower rail 11 is restrained and the seats 2 to 4 supported thereby are positioned. In addition, when the lock lever 24 is rotated and the lock claw 23 are separated from the penetration holes 12f and the lock holes 11i, the moving of the upper rail 12 (each of the seats 2 to 4) relative to the lower rail 11 is permitted.

In the meantime, by a torsion spring 25 (refer to FIG. 6) serving as an urging means, the lock lever 24 is always urged to a direction at which the lock claw 23 are inserted into the penetration holes 12f and the lock holes 11i, i.e., to a direction at which the moving of the upper rail 12 relative to the lower rail 11 is restrained. Also, when external operation force against the urging force of the torsion spring 25 is applied, the lock lever 24 is rotated to a direction at which the lock claw 23 are separated from the penetration holes 12f and the lock holes 11i, i.e., to a direction at which the moving of the upper rail 12 relative to the lower rail 11 is permitted.

Figure 7:
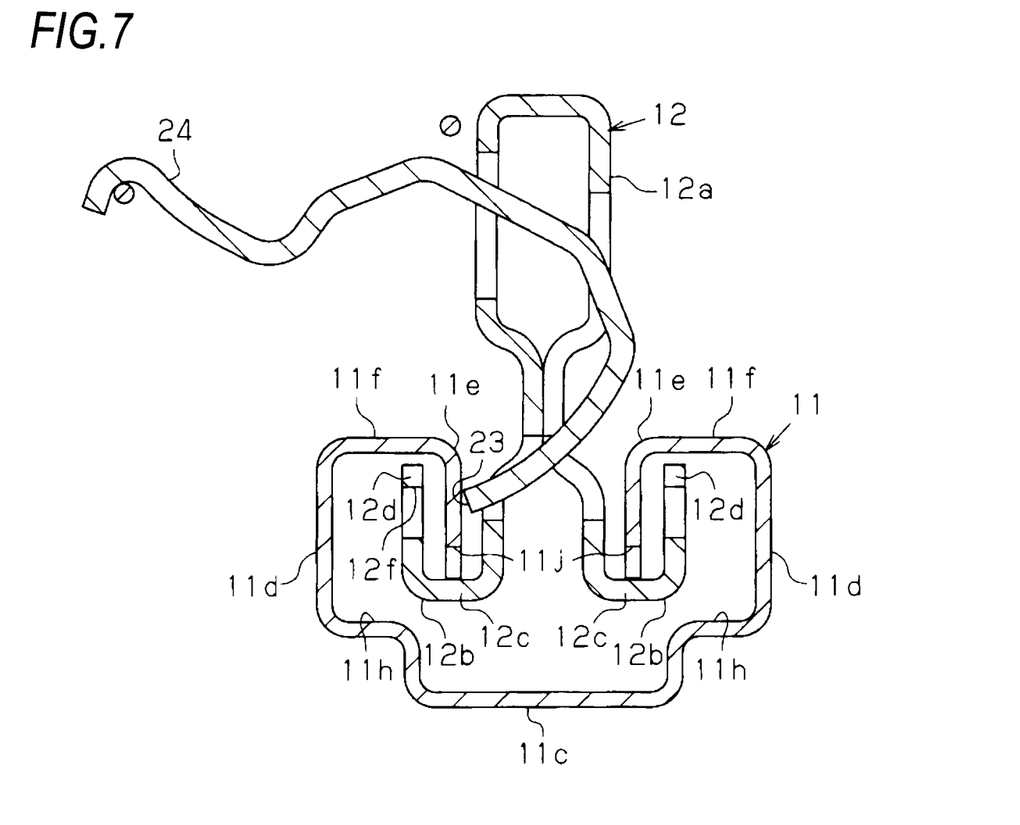
FIG. 7 is a sectional view taken along a line VII-VII of FIG. 6.
Figure 8:
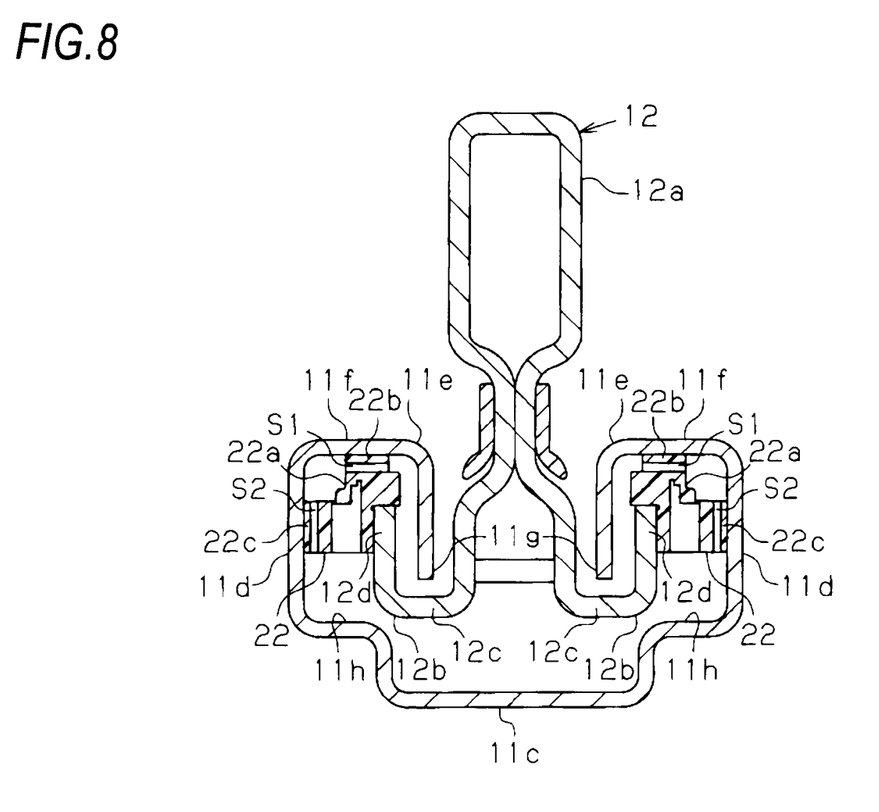
FIG. 8 is a sectional view taken along a line VIII-VIII of FIG. 6.

In the lower rail 11 of this illustrative embodiment, as shown in FIGS. 2, 6 and 7, an end of the lower rail hook part 11e (downward extension portion 11g), which is located at a position corresponding to the curvature part 11a, is formed as a notch part 11j to reduce a downward extending amount of the lower rail hook part 11e, compared to the other part of the lower rail hook part 11e. Specifically, in this illustrative embodiment, the notch part 11j is formed over an entire range corresponding to the curvature part 11a in the front-rear direction (i.e., the notch part is formed over the length L1) and is notched upwards by a predetermined amount in the entire range thereof in the front-rear direction. Also, in this illustrative embodiment, as shown in FIG. 2, the lock holes 11i are formed at the lower rail hook parts 11e with avoiding the notch parts 11j and the curvature part 11a (i.e., the lock holes are formed at the front side from the curvature part 11a and at the rear side from the curvature part 11a).

In the below, the characteristic operational effects of the above illustrative embodiment will be described.

(1) According to the lower rail 11 having the curvature part 11a, even if the vehicle has the vehicle floor 1a bent at the central part in the front-rear direction of the vehicle, as the above illustrative embodiment, it is possible to extend the lower rail including the central part. Therefore, it is possible to improve the degree of moving freedom of the upper rails 12 and the seats 2 to 4 supported by the upper rails, in the front-rear direction.

Also, the shoes 22 are arranged at the outer sides of the rolling members 21 in the front-rear direction of the vehicle. Accordingly, when the upper rail 12 passes through the curvature part 11a, the upper sliding contact parts 22b are prevented from being largely elastically deformed. Further, the sliding contact resistance thereof is prevented from being increased. Specifically, if the shoes are arranged between the pair of the rolling members, as the related art, when the upper rail passes through the curvature part, the upper rail at the positions at which the shoes are arranged is heightened with respect to the lower rail, so that the upper sliding contact parts may be largely elastically deformed. At this time, when the upper sliding contact parts are elastically deformed beyond a intended deformation, the sliding contact resistances may be increased. In contrast, according to the above configuration in which the shoes 22 are arranged at the outer sides of the pair of rolling members 21 in the front-rear direction of the vehicle, when the upper rail 12 passes through the curvature part 11a, the upper rail 12 at the positions at which the shoes 22 are arranged is lowered with respect to the lower rail 11 (refer to FIGS. 6 and 8). Therefore, when the upper rail 12 passes through the curvature part 11a, the upper sliding contact parts 22b are prevented from being largely elastically deformed. Further, the sliding contact resistances are prevented from being increased, and the smooth moving of the upper rails 12 (and seats 2 to 4 supported by the upper rails 12) is secured.

(2) The shoes 22 are provided in a pair in the front-rear direction of the vehicle and are respectively arranged at the outer sides of the pair of rolling members 21 in the front-rear direction of the vehicle. Accordingly, it is possible to suppress the upward rattling of the upper rail 12 in balance at both sides of the upper rail in the front-rear direction. Also, when the upper rail 12 passes through the curvature part 11a, the sliding contact resistance is prevented from being increased. Therefore, the smooth moving of the upper rails 12 (seats 2 to 4) is positively secured.

(3) Since the lock holes 11i are formed at the lower rail hook parts 11e with avoiding the curvature part 11a (i.e., the lock holes are formed at the front side from the curvature part 11a and at the rear side from the curvature part 11a), the upper rails 12 (seats 2 to 4) are not fixed at the position corresponding to the curvature part 11a (refer to FIG. 7). Accordingly, since the upper rail 12 is not fixed at the position corresponding to the curvature part 11a, at which it is concerned that the effect of suppressing the upward rattling of the upper rail 12 by the reduction of the elastic deformation amount of the upper sliding contact part 22b may be reduced, it is possible to avoid the rattling (and vibration due to the rattling) at a fixed state.

(4) Since the curvature part 11a is formed between the lower fixing parts 11b that are contacted and fixed on the upper surfaces of the floor fixing parts 1b, it is possible to strongly fix the lower rail 11 on the vehicle floor 1a without the rattling. Specifically, if the lower fixing parts 11b are formed at the curvature part 11a, it is difficult to fix the lower fixing parts 11b and the upper surfaces of the floor fixing parts 1b, so that the rattling easily occurs. However, according to the above illustrative embodiment, it is possible to strongly fix the lower rail 11 on the vehicle floor 1a with avoiding the rattling.

Figure 9:
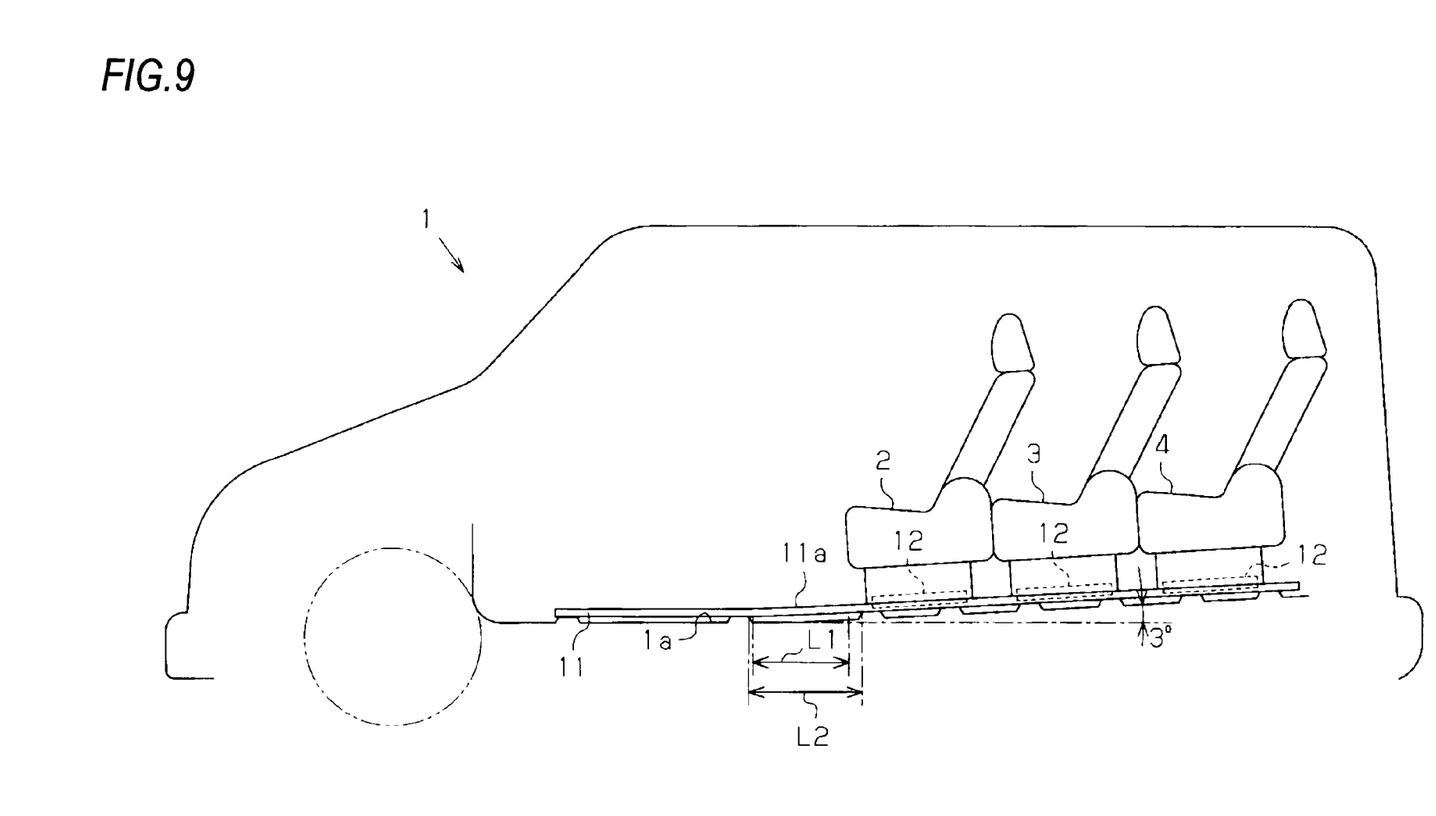
FIG. 9 is a schematic side view illustrating a vehicle and seats according to an illustrative embodiment.

(5) The three upper rails 12, which are respectively fixed to the seats 2 to 4, are supported on the lower rail 11. Accordingly, as the above illustrative embodiment, it is possible to improve the degree of moving freedom of the respective seats 2 to 4 in the front-rear direction, in a so-called three-row seat vehicle 1 having the front seat 2, the second-row seat 3 and the third-row seat 4. Specifically, as shown in FIG. 9, for example, when all the seats 2 to 4 are arranged rearwards to the maximum, it is possible to secure the larger mount space at the position of the assistant driver's seat. In comparing with a configuration in which the lower rail for the front seat 2 and the lower rails for the second-row seat 3 and the third-row seat 4 are separately provided, it is possible to reduce the number of parts.

(6) The end of the lower rail hook part 11e, which is located at the position corresponding to the curvature part 11a convex downwards, is formed as the notch part 11j to reduce the downward extending amount of the lower rail hook part, compared to the other part of the lower rail hook part 11e. Accordingly, when the upper rail 12 passes through the curvature part 11a, it is possible to prevent the upper rail hook parts 12b (outer extension portions 12c) between the rolling members 21 from contacting the ends (lower ends) of the lower rail hook parts 11e (downward extension portions 11g) in the upper-lower direction.

Specifically, it is preferable that the lower rail hook parts 11e (downward extension portions 11g) extend downwards as much as possible to prevent the upper rail hook parts 12b from being separated (the release of the engaging state). However, in a configuration where the notch part 11j is not provided, if the lower rail hook parts 11e extend downwards as much as possible on the assumption that the lower rail 11 does not have the curvature part 11a, when the upper rail 12 passes through the curvature part 11a, the upper rail hook parts 12b (outer extension portions 12c) between the rolling members 21 may be contacted to the ends (lower ends) of the lower rail hook parts 11e in the upper-lower direction. On the contrary, with considering the curvature part 11a, if the entire ends (lower ends) of the lower rail hook parts 11e (downward extension portions 11g) are set so as to prevent the contact, the gap between the upper rail hook parts 12b and the lower rail hook parts in the upper-lower direction is increased at positions except for the curvature part 11a. However, according to the above configuration in which the notch parts 11j are formed, the ends of the lower rail hook parts 11e extend downwards as much as possible at positions except for the curvature part 11a, so that it is possible to prevent the upper rail hook parts 12b (outer extension portions 12c) from contacting the ends of the lower rail hook parts 11e in the upper-lower direction at the curvature part 11a, while strongly preventing the separation of the upper rail hook parts 12b. Accordingly, the smooth moving in the front-rear direction can be secured.

Figure 10:
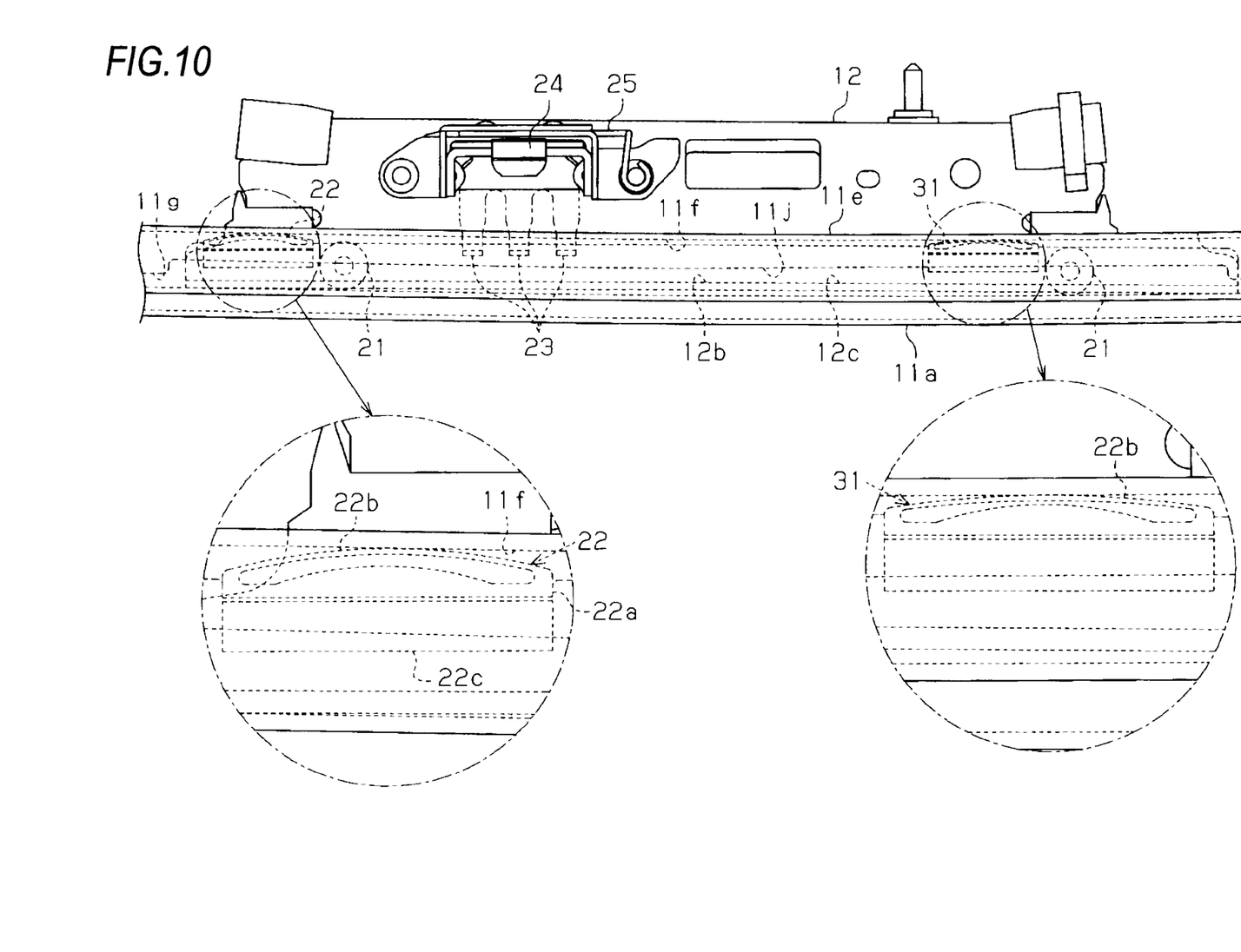
FIG. 10 is a side view of a seat slide apparatus for a vehicle according to another illustrative embodiment.

The above illustrative embodiment may be modified as follows. In the above illustrative embodiment, the pair of shoes 22 is provided in the front-rear direction of the vehicle, and the each of the shoes 22 is arranged at the outer sides of the pair of rolling members 21 in the front-rear direction of the vehicle. However, the disclosure is not limited thereto. For example, as shown in FIG. 10, one shoe 22 may be arranged at the outer side of the pair of rolling members 21 in the front-rear direction of the vehicle, and the other shoe 31 may be arranged between the pair of rolling members 21.

By the above configuration, when the upper rail 12 passes through the curvature part 11a, the sliding contact resistance of the one shoe 22 is reduced and the sliding contact resistance of the other shoe 31 is increased. Accordingly, the sliding contact resistances are cancelled between the pair of shoes, so that it is possible to reduce a difference with the total contact resistance when the upper rail 12 moves along the linear part of the lower rail 11.

In the above illustrative embodiment, the lock holes 11i are formed at the lower rail 11 with avoiding the curvature part 11a (i.e., the lock holes are formed at the front side than the curvature part 11a and at the rear side from the curvature part 11a). However, the disclosure is not limited thereto. For example, the lock hole may be formed at the lower rail 11 at the position corresponding to the curvature part 11a.

In the above illustrative embodiment, the curvature part 11a is formed between the lower fixing parts 11b that are contacted and fixed on the upper surface of the floor fixing parts 1b. However, the disclosure is not limited thereto. For example, the lower fixing parts 11b may be formed at the curvature part 11a.

In the above illustrative embodiment, the three upper rails 12, which are respectively fixed to the seats 2 to 4, are supported on the lower rail 11. However, the disclosure is not limited thereto. For example, it may be a seat slide apparatus for a vehicle in which only one upper rail 12 (seat) is supported, or in which a seat slide apparatus for a vehicle in which two or four or more upper rails 12 (seats) are supported.

In the above illustrative embodiment, the lower rail 11 has the bottom wall part 11c, the sidewall parts 11d and the pair of lower rail hook parts 11e. However, the disclosure is not limited thereto. For example, the other configuration is also possible such that at least one lower rail hook part 11e is provided and the lower rail may be fixed on the vehicle floor 1a in the other configuration. In addition, when one lower rail hook part 11e is provided, the upper rail 12 may be have at least one upper rail hook part 12b such as one upper rail hook part 12b.

In the above illustrative embodiment, the curvature part 11a has the circular arc shape having a radius of about 7000 mm and is formed over a predetermined length 367 mm of the lower rail 11 in the front-rear direction. However, the numerical values may be changed. In the case of changing the values, the numerical values may be preferably changed, based on the inclination angle of the vehicle floor 1a (three degrees in the above illustrative embodiment) and the length between the lower fixing parts 11b corresponding to the curvature part 11a (400 mm in the above illustrative embodiment).

In the above illustrative embodiment, the curvature part 11a has the circular arc shape having the center point at the upper. However, it may be used the other curvature part (which is smoothly bent except for the circular arc shape) such that it is downwards convexly curved as viewed from the width direction of the vehicle.

In the above illustrative embodiment, the lower rail hook part 11e has the inner extension portion 11f extending toward the inner side in the width direction of the vehicle (opposite direction) and the downward extension portion 11g extending downwards from the end of the inner extension portion 11f. However, the shape is not limited thereto. The lower rail hook part extends at least in the width direction of the vehicle (the upper sliding contact part 22b so as to slidingly contacts on the lower surface thereof). For example, the lower rail hook part may be modified into a shape that is entirely curved.

What is claimed is:

1. A seat slide apparatus for a vehicle comprising:
a lower rail that is fixed on a vehicle floor and extends in a front-rear direction of the vehicle; and
an upper rail that is fixed to a seat and is movably supported on the lower rail in the front-rear direction of the vehicle,
wherein the lower rail has a lower rail hook part extending in a width direction of the vehicle,
wherein the upper rail has:
a pair of rolling members, which allow the upper rail to move with respect to the lower rail in the front-rear direction, and which are arranged in the front-rear direction of the upper rail; and
a shoe, which has a sliding contact part that slidingly contacts a lower surface of the lower rail hook part by elastic force so as to suppress the upper rail from rattling upwards with respect to the lower rail,
wherein the lower rail has a curvature part that is convex downwards as viewed from the width direction of the vehicle and is curved in the front-rear direction of the vehicle, and
wherein the shoe is arranged at an outer side of the pair of rolling members in the front-rear direction of the vehicle.

2. The seat slide apparatus for the vehicle according to claim 1,
wherein the shoe is provided in a pair in the front-rear direction of the vehicle, and
wherein the shoe is respectively arranged at outer sides of the pair of rolling members in the front-rear direction of the vehicle.

3. The seat slide apparatus for the vehicle according to claim 1,
wherein the shoe is provided in a pair in the front-rear direction of the vehicle, and
wherein the one shoe is arranged at the outer side of the pair of rolling members in the front-rear direction of the vehicle and the other shoe is arranged between the pair of rolling members.

4. The seat slide apparatus for the vehicle according to claim 1,
wherein the lower rail is formed with a plurality of lock holes in a longitudinal direction thereof,
wherein the upper rail has a lock claw that can be inserted into the lock holes and restrain the upper rail from moving relatively to the lower rail in the front-rear direction, and
wherein the lock holes are formed at the lower rail with avoiding the curvature part.

5. The seat slide apparatus for a vehicle according to claim 4,
wherein the lock holes are formed at the front side from the curvature part and at the rear side from the curvature part.

6. The seat slide apparatus for the vehicle according to claim 1,
wherein the vehicle floor has a plurality of floor fixing parts, which are protruded upwards, and which are arranged in the front-rear direction,
wherein the lower rail has a plurality of lower fixing parts, which are respectively contacted and fixed on upper surfaces of the floor fixing parts, and which are arranged in the front-rear direction, and
wherein the curvature part is formed between the lower fixing parts.

7. The seat slide apparatus for the vehicle according to claim 1,
wherein three upper rails fixed to respective seats are supported on the lower rail.

8. The seat slide apparatus for the vehicle according to claim 1,
wherein the curvature part has a circular arc shape having a center point at an upper side as viewed from the width direction of the vehicle.

9. The seat slide apparatus for the vehicle according to claim 1,
wherein the lower rail hook part has:
a pair of inner extension portions extending toward an inner side in the width direction of the vehicle, wherein each of the pair of the inner extension portions extends opposite each other; and
a downward extension portion extending downwards from an end of the inner extension portion.

10. A seat slide apparatus for a vehicle comprising:
a lower rail that is fixed on a vehicle floor and extends in a front-rear direction of the vehicle; and
an upper rail that is fixed to a seat and is movably supported on the lower rail in the front-rear direction of the vehicle,
wherein the lower rail has a lower rail hook part extending in a width direction of the vehicle,
wherein the upper rail has:
a pair of rolling members, which allow the upper rail to move with respect to the lower rail in the front-rear direction, and which are arranged in the front-rear direction of the upper rail; and
a shoe, which has a sliding contact part that slidingly contacts a lower surface of the lower rail hook part by elastic force so as to suppress the upper rail from rattling upwards with respect to the lower rail,
wherein the lower rail has a curvature part that is convex downwards as viewed from the width direction of the vehicle,
wherein the shoe is arranged at an outer side of the pair of rolling members in the front-rear direction of the vehicle
wherein the shoe is provided in a pair in the front-rear direction of the vehicle, and
wherein the one shoe is arranged at the outer side of the pair of rolling members in the front-rear direction of the vehicle and the other shoe is arranged between the pair of rolling members.

* * * * *